No. 762,567. PATENTED JUNE 14, 1904.
J. W. WILLETT.
MEANS FOR CULTIVATING.
APPLICATION FILED MAR. 1, 1904.
NO MODEL.
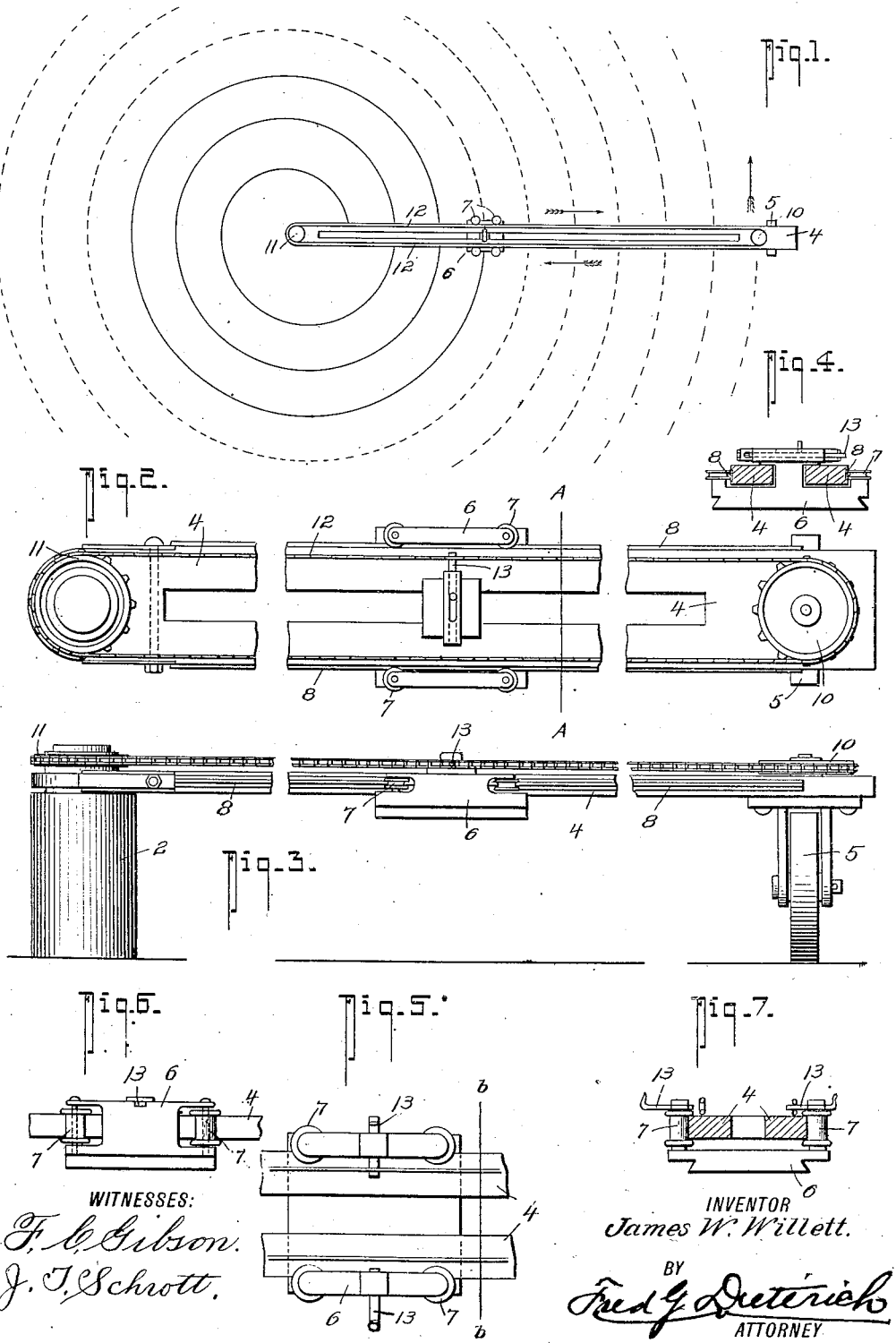
WITNESSES:
F. C. Gibson
J. T. Schrott
INVENTOR
James W. Willett.
BY
Fred G. Dieterich
ATTORNEY No. 762,567.

Patented June 14, 1904.

UNITED STATES PATENT OFFICE.

JAMES W. WILLETT, OF STANTON, MICHIGAN.

MEANS FOR CULTIVATING.

SPECIFICATION forming part of Letters Patent No. 762,567, dated June 14, 1904.

Application filed March 1, 1904. Serial No. 195,986. (No model.)

*To all whom it may concern:*

Be it known that I, JAMES W. WILLETT, a citizen of the United States of America, residing at Stanton, Michigan, have invented a new and useful Improvement in Means for Cultivating, of which the following is a specification.

My invention relates to an improved means for cultivating and seeding land on what may be called a "circular" or "spiral" system, and is designed to afford a greater precision in the movement of the cultivating appliance than is obtainable under the methods at present followed.

Under the present practice the regularity of the lines of cultivation is dependent to a greater or less degree on the directness of the effort with which the cultivating implement is moved, and as it is difficult to maintain a straight line under the present system no great precision is obtainable in the lines of cultivation. This is a serious drawback not only in the amount of land wasted in providing room for cultivation allowing for the possible variation between the rows of plants, but also in the loss of time absorbed by the greater care and the greater skill required to be exercised during the several operations involved between preparing the land for the crop and the harvesting of it.

Under the method which I propose to adopt the various seeding or cultivating implements are removably secured to a carriage which is mechanically moved along a beam which is itself rotatable about a fixed post or axis, so that the line of cultivation is a continuous spiral, being a combination of the rotational and radial movements. With this system, as the movement and rate of change will occur in a precise mechanical manner, the pitch of the line may be as close as the character of the crop will allow and without any allowance for possible irregularities either while seeding or in the subsequent operations of weeding, cultivating, or harvesting. It may also be used as a means for irrigating or for applying fertilizers to the roots of the plants, as the precise line of movement will permit such to be applied without waste.

The system, although originally intended for market-garden crops, is susceptible of development to satisfy the requirements of field crops, although I have not as yet so far matured the construction of my mechanical means to make it applicable to such.

The manner in which I propose to apply the system in practice is set forth in the following specification and illustrated in the drawings which accompany it.

Figure 1 is a plan showing the application of my system and the means by which the spiral track is produced. Fig. 2 is an enlarged detail of the radial beam in plan; Fig. 3, a side elevation of the same; Fig. 4, a cross-section on the line A A in Fig. 2, showing the beam-carriage to which any required agricultural implement may be secured. Fig. 5 is a top plan view. Fig. 6 is a side elevation, and Fig. 7 is a cross-section, of a slightly-modified construction of my invention.

In the drawings the pivot or post about which the beam rotates is indicated by 2, and toward the upper end of this post at a suitable distance above the surface of the ground to suit the character of the cultivating appliances a beam 4 is rotatably mounted, which beam may be supported at its outer end by a wheel or roller 5. Movable endwise on this beam is a carriage 6, to which any desired agricultural appliance may be removably secured either by a dovetailed engagement, as shown in Fig. 4, or in any manner convenient for quick change. The carriage 6 may be provided with grooved rollers 7 to run on tracks 8 on each side of the beam. At the extreme outer end of the beam is mounted a sprocket-wheel 10, and fixed to the post, so as to be secure against rotation, is a corresponding sprocket-wheel 11. An endless chain 12 passes round these two sprockets and may be supported on the upper side of the beam. The sprocket 11 being fixed to the pivot, as the beam is rotated the chain will be drawn round the sprockets the distance of one circumference for each revolution of the radial beam.

The attachment of the carriage to the chain may conveniently be effected by a bolt 13, slidable through an upwardly-projecting portion of the carriage, which bolt may be inserted in any link of the chain, as required, when the carriage will travel with the chain along the beam as it rotates at the rate of progression before mentioned.

The beam may be rotated by any suitable power, preferably operating toward the pivot. Animal, wind, or electricity naturally suggest themselves to the inventor as being sources of power well adapted to the purpose, and the construction of the framework may be modified to the requirements of each without departing from the spirit of the invention. Means will also be provided for regulating the speed of rotation of the beam, so as to maintain a uniform speed of the cultivating appliance at the varying-arm.

In the larger sizes the beam may extend each way from the center, so that one will counterbalance the other and an implement be applied to each. The beams may also be supported by tie-rods from an upward extension of the pivot.

It will probably be found convenient to connect the implement to the carriage 6 in such a manner that it may rise and fall to adapt itself to irregularities in the surface of the land it is applied to; but such points are not material to the present application.

In Figs. 5, 6, and 7 I have shown a slightly-modified form of my invention, in which the tracks 8 are eliminated and the sides of the beam 4 serve as the track proper, with which the rollers 7 engage, and in this form the locking-pins 13 are carried by the cross-beam which connects the spindles of the rollers 7.

I do not desire to be confined to the particular construction here revealed, which is susceptible of considerable variation to suit the requirements of the work and the convenience of manufacture, but believe I am original in the application of a cultivating or seeding implement to a rotatable beam and its congressive movement along such.

I therefore declare that what I claim as new, and desire to be protected in by Letters Patent, is—

1. As a means for determining the path of an agricultural implement a beam rotatably mounted on a vertical axis, a member to which said agricultural implement may be attached said member being endwise movable on the beam, and means for moving the member along the beam coöperatively with the rotation of the beam.

2. As a means for determining the path of an agricultural implement, a beam rotatably mounted on a vertical axis, a member movable endwise on the beam to which member said agricultural implement may be removably secured, a sprocket-wheel secured to the pivot, a corresponding sprocket rotatably mounted on the outer end of the beam an endless chain passing around these said sprocket-wheels and means for connecting the implement-carrying member to the chain.

3. A cultivating apparatus comprising in combination with cultivating implements, of means for moving said implements in a spiral path for the purposes specified.

4. A cultivating apparatus comprising in combination with cultivating implements, of means for moving said implements in a spiral path, said means including a beam rotatably mounted on a vertical axis and an implement-carrier mounted on said beam for radial movement thereon for the purposes specified.

5. A cultivating apparatus comprising in combination with cultivating implements, of means for moving said implements in a spiral path, said means including a beam rotatably mounted on a vertical axis, a loose sprocket-wheel carried by said beam and a fixed sprocket-wheel at said vertical axis, an endless chain passing over said sprocket-wheels, an implement-carrier mounted for longitudinal movement on said beam and having a portion for engaging said sprocket-chain for the purposes specified.

6. As a means for determining the path of agricultural implements, a beam rotatably mounted on a vertical axis, a fixedly-held sprocket and a loosely-held sprocket coöperating with said beam, an endless chain passing over said sprockets, a carriage movably mounted on said beam for longitudinal movement thereon, said carriage being detachably connected to said endless chain, and means for supporting the free end of the beam.

7. As a means for determining the path of an agricultural implement, a beam rotatably mounted on a vertical axis, said beam having track-guides, a carriage having grooved rollers for engaging said track-guides mounted on said beam, a fixed sprocket held at the pivot-point of the beam, and a loosely-mounted sprocket carried by the free end of the beam, an endless chain passing over said sprockets and engaging said carriage, means for supporting the free end of the beam for the purposes specified.

8. In an agricultural apparatus, means for moving an agricultural implement in a spiral direction.

In testimony whereof I have signed my name to this specification in the presence of two subscribing witnesses.

JAMES W. WILLETT.

Witnesses:
 ROWLAND BRITTAIN,
 ELLICE WEBBER.